United States Patent [19]

Mikurak

[11] 3,881,912

[45] May 6, 1975

[54] WELDING FILLER MATERIAL

[75] Inventor: John Mikurak, Darby, Pa.

[73] Assignee: Hoeganaes Corporation, Riverton, N.J.

[22] Filed: Dec. 28, 1973

[21] Appl. No.: 429,184

[52] U.S. Cl. ............... 75/.5 BA; 29/504; 75/.5 BC
[51] Int. Cl. ...................... C22c 39/30; B23k 35/02
[58] Field of Search ............. 75/.5 C, .5 BC, .5 BA, 75/.5 BB, 12 K, 12 L, 12 J, 12 N; 264/5, 11, 12; 148/36, 126; 29/504

[56] References Cited
UNITED STATES PATENTS

| | | | |
|---|---|---|---|
| 3,511,646 | 5/1970 | Von Scheele et al. | 75/.5 BA X |
| 3,597,188 | 8/1971 | Neumann | 75/.5 C X |
| 3,687,654 | 8/1972 | Huseby | 75/.5 BA |

*Primary Examiner*—L. Dewayne Rutledge
*Assistant Examiner*—Arthur J. Steiner
*Attorney, Agent, or Firm*—Paul Maleson; Morton J. Rosenberg

[57] ABSTRACT

A composition for and method of making an iron alloy filler material for use in welding. The filler material has a chemical composition which includes between 0.01 percent to 0.15 percent carbon; 0.15 percent to 2.0 percent manganese; between 0.01 percent to 2.0 ppercent nickel; between 0.01 percent to 1.00 percent molybdenum; about 0.25 percent chromium with traces of silicon, sulphur, phosphorus, residuals normally found during conventional steelmaking procedures and with the balance being iron. The filler material is produced through the consecutive steps of melting, atomization, annealing and particle size determination. The filler material is made such that it contains a maximum of 5.0 percent particles by weight which are smaller than the mesh size of a U.S. Standard No. 200 sieve. The filler is further made such that it contains a maximum of 5.0 percent particles by weight which are larger than the mesh size of a U.S. Standard No. 40 Sieve.

15 Claims, No Drawings

3,881,912

WELDING FILLER MATERIAL

BACKGROUND OF THE INVENTION

1. FIELD OF THE INVENTION

This invention pertains to the field of welding. In particular, this invention relates to the field of composition for and methods of making filler materials for welding. More in particular, this invention pertains to the field of filler materials for submerged arc welding. Still further, this invention relates to atomized filler materials used in welding processes. In particular, this invention pertains to atomized welding filler material having a predetermined particle size for use in submerged arc welding..

2. PRIOR ART

Iron based alloy powders used for welding processes are known in the art. However, some prior filler materials are made through the standard sponge iron technique. In such prior processes, alloy powders are mixed with iron powder in the proper percentages. This mixture is then compressed, disintegrated, and annealed. The resulting prior art filler powder is thus comprised of separate iron particles and alloy particles. Such prior art filler powders are not homogeneous. Each particle does not have a uniform chemical analysis. Further, in such prior powders, disintegration of the compressed alloy is generally through a mechanical device such as a hammer mill or like apparatus. Thus, in such prior powders, the particle size distribution is not completely controlled which may lead to a varying deposition rate for even one batch of prior art filler materials. Thus, in such powder materials, numerous welding passes may have to be initiated before an acceptable weld is achieved.

In prior art welding filler materials, not produced by atomization has thus shown non-homogeneity when viewed microscopically. This undesirable property by itself would require changing electrical parameters during the welding step to achieve constant weld parameters. Such changes during one weld pass are not achievable in the present welding state of the art. Thus, several welding passes may be made to form an acceptable weld, which decreases the weld deposition rate.

Further, in some prior welding filler materials, the particle size distribution is not closely controlled. In such prior fillers, the weight percent of powder fines smaller than a No. 200 sieve (U.S. Standard) may be higher than 5.0 percent. It has been found that when these small fines represent more than 5.0 percent of the filler material, such leads to voids being formed at the weld/metal interface area. This has a derogatory effect on the strength of the weld.

In some prior art welding filler powders, the apparant density has been controlled to less than 3.0 grams/c.c. This control of the apparent density of the filler powders to such a low level has increased the heat affected zone of the weld and makes it wider. This has the effect of lowering the strength of the welded part. In some prior art welding filler powderrs, the apparent density has been controlled to greater than 3.9 grams/c.c. which has the effect of causing backflash and bubbling thereby causing a non-homogeneous weld surface.

SUMMARY OF THE INVENTION

An atomized filler material for submerged arc welding. The filler material consists essentially of by weight: (a) from 0.01 percent to 0.05 percent carbon; (b) from 0.15 percent to 2.0 percent manganese; (c) from 0.01 percent to 0.15 percent silicon; (d) a maximum substantially equal to 0.020 percent sulphur; (e) a maximum substantially equal to 0.015 percent phosphorus; (f) maximum substantially equal to 0.25 percent chromium; (g) from 0.01 percent to 2.0 percent nickel; (h) from 0.01 percent to 1.00 percent molybdenum; and, (i) the balance being iron. The atomized filler material forming rounded paticles having a particle size less than a No. 20 sieve.

DESCRIPTION OF THE PREFERRED EMBODIMENTS

The present invention is directed to an improved filler material and method of making the filler material for use in welding. The filler material is an alloy iron powder which is produced through atomization therby forming a filler material powder which is homogeneous in nature. As will be described in following paragraphs, the alloy iron powder filler material is formed to a specified particle size distribution range and has a predetermined chemical composition. The combined effect of particle size distributions, homogeneity, and chemical composition permits higher deposition rates, increased structural weld porperties and the use of less filler material than previously found in the welding art.

The improved filler material of the present invention consists of generally speroidal iron alloy particles having an apparant density within the range of 2.9 to 3.85 grams/c.c and preferably within the range of 3.0 to 3.24 grams/c.c. Further, the pulverulent filler material has particle sizes where less than 5.0 percent by weight of the filler material particles have a particle size less than a No. 200 sieve (U.S. Standard). It is also preferred that the filler material be in a particle size range in exces s of a No. 40 sieve.

In chemical composition, the improved atomized filler material of the present invention consists essentially of by weight: (a) from 0.01 percent to 0.05 percent carbon; (b) from 0.15 percent to 2.0 percent manganese, preferably being from 0.15 percent to 0.50 percent manganese; (c) from 0.01 percent to 0.15 percent silicon; (d) less than or equal to 0.20 percent sulphir; (e) less than or equal to 0.015 percent phosphorus; (f) less than or equal to 0.25 percent chromium; (g) from 0.01 percent to 2.0 percent nickel, preferably from 1.75 percent to 2.0 percent nickel; (h) from 0.01 percent to 1.0 percent molybdenum; and, (i) the balance being iron.

In the overall welding general concept, a pair of base metals are placed adjacent each other. The metals have end surfaces which may define a V-shaped (or other contour) groove between them.

A bonding strip of copper metal or other like backing material is placed contiquous with the back surfaces of the base metals and forms the bottom of the groove. The filler material is inserted into the groove up to the level defined by the upper surfaces of the base metals to be welded together. A powder or pulverulent flux material covers the filler material. The flux material to be used with the filler material of the present invention is chemically basic in nature and will be described in following paragraphs. As is usual, an electrode is positioned at or near the upper surface of the filler material, and within the flux material. An electric current is supplied and a pool of molten metal is formed between the base metals. The pool is protected from being oxidized by the flux material. After cooling, the backing strip and slag formed by the flux material is removed.

A molten iron alloy is produced through standard processes such as basic oxygen, electric furnace, open hearth and like standard methods. The molten iron alloy includes by by weight percent: Approximately from 0.45 percent to 0.55 percent carbon; approximately from 0.01 percent to 0.50 percent manganese, preferably from 0.15 percent to 2.0 percent manganese; approximately from 0.01 percent to 0.15 percent silicon; approximately less than or equal to 0.020 percent sulphur; approximately less than or equal to 0.25 percent chromium; approximately from 0.01 percent to 2.0 percent nickel, preferably from 1.75 percent to 2.0 percent nickel; approximately from 0.01 percent to 1.00 percent molybdenum, preferably from 0.25 percent to 0.50 percent molybdenum; and the balance being iron.

Initially, the iron alloy is brought to a molten state in a standard furnace well known in the steelmaking art. The molten alloy is then poured into a tundish or crucible and maintained at substantially atmospheric pressure and at a temperature approximating 1,700°C. (approximately 3,100°F.). The tundish may be a cone shaped housing element having one or more openings adjacent the bottom section defining the minimum diameter portion of the cone shaped housing. The molten alloy iron passes through the openings by gravity assist.

Atomization occurs when the falling molten metal path is intersected by annular jets of water. The water impinges on the molten metal and breaks it up into particulates which are substantially spheroidal in geometric contour. The initial water temperature (before impingement with the molten metal) is generally found to approximate 21°C. (70°F.) and a final water temperature approximates 63°C. (145°F.). The water jets are adjusted to provide an apparant density of the atomized particles within the range of 2.9 to 3.85 grams/c.c. and preferably within the apparant density range of 3.0 to 3.25 grams/c.c. It should be understood that the apparant density of the filler material although controllable to some extent by adjustments made in the atomization process, may also be controlled by other known techniques such as hammer-muill g. In one set of successful runs giving an approximate apparant density of 3.1 grams/c.c., the water jets are downwardly directed at an angle approximating 18°. The pressure of the water approximates 800 psi, with a water flow rate of about 660 gal./min. corresponding to a molten metal flow rate of about 700 lbs./min.

The particles continue to fall by gravity assist after the water impingement. The particles drop into a container partially filled with water where they are cooled. The particulates are then removed from the tank or container by a vacuum system well known in the art. The wet particles are transported to a fine or micro mesh screen where the water is allowed to run off. This results in partial drying of the particles. After being partially dried, the particles are moved to a rotary kiln where they are dried. Although not important to the inventive concept, the drying temperature within the kiln is maintained at approximately 100°C. (212°F.) with the time spent within the kiln being sufficient to thoroughly dry the particles.

The now dried alloy powder particles are moved to an equalizer apparatus which is well known in the art. The equalizer or silo has baffles formed therein and the powder passes therethrough by gravity assist. The powder is then fed onto a sieve No. 200 mesh screen (U.S. Standard). The fines pass through the screen and the remainder of the powder is removed for annealing. Some fines of smaller particle size than No. 200 sieve will remain in the powder to be further processed. It is important that these fines do not exceed 5.0 percent of the weight of the powder filler material being produced. Thus, as will be shown in following paragraphs, this percentage is checked and the powder is repetitively screened until the fines comprise less than 5.0 percent by weight of the filler material.

The screened powder is then placed within an annealing furnace. The furnace atmosphere is a standard reducing atmosphere which for example may be hydrogen or disassociated ammonia. As is usual, the furnace temperature is maintained at a predetermined temperature within the range 800°C. to 1,100°C. The annealing time is generally from 10 minutes to 1.75 hours depending on the composition of the powder as well as the powder quantity. The annealing step as herein described reduces the carbon content from the initial state to a range of between 0.01 percent to 0.05 percent by weight of the annealed powder. The annealed powder is removed from the annealing furnance and allowed to cool through free or forced air convection, not important to the inventive concept as herein detailed. The now annealed filler material powder or particles are cooled to room temperature.

The filler material particles are then brought to an equalizer system, which is well known in the art. The equalizer includes a vertically directed housing with baffles disposed therein. The powder is inserted at the top section of the equalizer and through gravity assist, strike the baffles and are mixed thoroughly. The powder is homogeneously mixed so that large and small particles are mixed in substantially the same proportion as found in the particle size distribution analysis. The well mixed filler material particles are passed from the lower end of the equalizer apparatus.

The filler material particles are then transported to a screening operation where they are passed through a No. 20 sieve (U.S. Standard). This may be accomplished manually or within a standard disintegrator apparatus. The resulting powder is tested to insure that the mixture contains a maximum of 5.0 percent by weight of fines having less than a No. 200 sieve. The process is repeated until the required maximum of 5.0 percent fines exist. The filler material is then tested to ensure that the mixture contains a maximum of 5.0 percent by weight of particles larger than a No. 40 sieve mesh size. As in the case of the fines, if more than 5.0 percent of the large particles are found in the mixture, then the screening process is repeated until the proper percentage is achieved.

The final screen analysis of the improved filler material particles is thus found to be:

| Sieve No. (U.S. Standard) | Weight Percent |
| --- | --- |
| +20 | 0.0 |
| −32/+40 | 5.0 max. |
| −40/+60 | 10.0–30.0 |
| −60/+80 | 30.0–50.0 |
| −80/+100 | 25.0–45.0 |
| −100/+200 | 10.0 max. |
| −200 | 5.0 max. |

Once processed and tested for the proper particle size distribution, the filler material is packaged for use in the welding process as previously described. The filler material is used in conjunction with a basic flux composition. Although a wide variety of flux compositions are applicable, one such flux composition which has been used successfully includes the following composition by weight percentage: (a) about 7.0 percent silicon dioxide; (b) about 25.0 percent manganese dioxide; (c) about 8.0 percent calcium oxide; (d) about 37.5 percent calcium fluoride; (e) about 7.5 percent magnesium oxide; and (f) about 15.0 percent aluminum oxide.

The following examples have been run to illustrate the composition for and method of making the improved iron alloy filler material of the present invention.

EXAMPLE 1

Filler material was prepared having the following composition weight percentages:

|  | Molten Alloy Iron | Annealed Alloy Iron |
|---|---|---|
| Carbon | 0.45% | 0.01% |
| Manganese | 0.15% | 0.14% |
| Silicon | 0.01% | 0.009% |
| Sulphur | 0.018% | 0.015% |
| Phosphorus | 0.015% | 0.015% |
| Chromium | 0.25% | 0.24% |
| Nickel | 0.01% | 0.01% |
| Molybdenum | 0.01% | 0.01% |
| Iron | Balance | Balance |

The above molten alloy composition was atomized as previously described. The apparant density of the resulting filler material was found to be approximately 2.9 grams/c.c. The atomized powder was annealed in an annealing furnace at a temperature of 800°C. for two hours. The annealing furnace atomosphere was disassociated ammonia. After annealing, the mixture was found to be lightly caked and was mixed and broken up into discrete particles as previously described. The resulting filler material particles were screened through a No. 200 sieve and a No. 20 sieve (both U.S. Standard). The resulting filler material had a screen analysis weight percentage as follows:

| Sieve No. (U.S. Standard) | Weight Percentage |
|---|---|
| +20 | 0 |
| −32/+40 | 4.0 |
| −40/+60 | 12.0 |
| −60/+80 | 35.5 |
| −80/+100 | 40.4 |
| −100/+200 | 7.0 |
| −200 | 1.1 |

The resulting filler material particles were then applied to a submerged arc welding process using the filler material previously disclosed. The heat affected zone at the weld interface was found to be wider than expected, thus causing a reduced impact strength. The weld produced was substantially homogeneous upon visual inspection. Although this example produced a good weld, the same composition was used and adjusted (by hammer milling) to an apparant density of 3.10 grams/c.c. In this case, the weld produced had a higher impact strength due to the fact that the heat affected zone was considerably diminished.

In the same example composition, the percentage of powder fines having a particle size less than a No. 200 sieve was increased to 6.0 percent of the filler material by weight. Upon welding, it was found that porosity existed at the interface between the weld and the welded metal. This lowered the weld strength and was deemed unacceptable.

EXAMPLE 2

Filler material alloy iron particles were prepared having the following weight percentages:

|  | Molten Alloy Iron | Annealed Alloy Iron |
|---|---|---|
| Carbon | 0.55% | 0.05% |
| Manganese | 2.0% | 1.99% |
| Silicon | 0.01% | 0.01% |
| Sulphur | 0.020% | 0.018% |
| Phosphorus | 0.15% | 0.15% |
| Chromium | 0.25% | 0.25% |
| Nickel | 2.0% | 2.0% |
| Molybdenum | 1.0% | 0.97% |
| Iron | Balance | Balance |

The above stated molten alloy composition was atomized to produce substantially composition consistent particles. The atomized powder was annealed in an annealing furnace at a temperature of 1,100°C. for 1.5 hours. The annealing furnace atmosphere was disassociated ammonia. After annealing the mixture was mixed in an equalizer and screened through a No. 200 and a No. 20 sieve. The resulting filler material had a screen analysis weight percentage as follows:

| Sieve No. (U.S. Standard) | Weight Percentage |
|---|---|
| +20 | 0.0 |
| −32/+40 | 5.0 |
| −40/+60 | 10.5 |
| −60/+80 | 44.5 |
| −80/+100 | 25.0 |
| −100/+200 | 10.0 |
| −200 | 5.0 |

The filler material was once again applied to a submerged arc welding process using the basic flux composition previously detailed. However, the basic filler composition was adjusted throughout the range of 2.9 grams 1c.c. to 3.85 gram/c.c. The following results were obtained:

| No. | Apparant Density (grams/c.c.) | Weld Comments |
|---|---|---|
| 1 | 2.9 | Large Heat affected Zone |
| 2 | 3.0 | Excellent Weld-no porosity-high strength |
| 3 | 3.25 | Excellent Weld-no porosity-high strength |
| 4 | 3.5 | Good Weld-some backflash and bubbling seen |
| 5 | 3.85 | Fair Weld-backflash and bubbling observed. |

Utilizing substantially the same example composition, the percentage of powder fines having a particle size less than No. 200 sieve was increased to 8.0 percent of the filler composition by weight. Once again, upon welding, it was observed that porosity existed at the weld interface resulting in a low weld strength capability.

EXAMPLE 3

Filler weld material was prepared having the following composition weight percentages:

|  | Molten Alloy Iron | Annealed Alloy Iron |
|---|---|---|
| Carbon | 0.45% | 0.025% |
| Manganese | 0.50% | 0.48% |
| Silicon | 0.15% | 0.13% |
| Sulphur | 0.020% | 0.017% |
| Phosphorus | 0.015% | 0.014% |
| Chromium | 0.25% | 0.23% |
| Nickel | 1.75% | 1.70% |
| Molybdenum | 0.25% | 0.25% |
| Iron | Balance | Balance |

The molten alloy iron composition was atomized through impingement by water jets on a falling stream of molten alloy iron. The atomized powder was cooled in a water bath and then annealed in an annealing furnace at a temperature of 1,000°C. for 1.5 hours. The annealing furnace atmosphere was disassociated ammonia. The annealed material was lightly caked and was mixed and broken into discrete particles. The resulting filler material particles were screened through a No. 200 sieve and a No. 20 sieve. The resulting filler material had a screen analysis weight percentage as follows:

| Sieve (U.S. Standard) | Weight Percentage |
|---|---|
| +20 | 0 |
| −32/+40 | 3.0 |
| −40/+60 | 20.0 |
| −60/+80 | 48.0 |
| −80/+100 | 25.0 |
| −100/+200 | 3.0 |
| −200 | 1.0 |

The filler material was used in a submerged arc welding process with the basic flux composition previously described. The apparant density of the filler material was adjusted throughout the range of 2.75 grams/c.c. to 3.90 gram/c.c. The following results were obtained:

| No. | Apparant Density (grams/c.c.) | Weld Comments |
|---|---|---|
| 1 | 2.75 | Fair Weld-Large Heat affected zone-low porosity |
| 2 | 3.0 | Excellent Weld-high strength-no porosity seen |
| 3 | 3.25 | Excellent Weld- High strength-no porosity observed. |
| 4 | 3.5 | Good Weld-some backflash and bubbling seen |
| 5 | 3.90 | Fair Weld-backflash and bubbling observed. |

Using substantially the same composition, the percentage of powder fines having a particle size less than No. 200 sieve was increased to 10.0 percent by weight of the filler composition. Upon welding, porosity was observed at the weld interface resulting in a low weld strength. The powder fines was then decreased to 6.0 percent by weight of the filler material. The resulting weld had some porosity and voids at the weld/metal interface area, however substantially less than when 10.0 percent of fines were used. The apparant density for this phase of the test was chosen as 3.0 grams/c.c. (that density which gave excellent welding characteristics before).

EXAMPLE 4

Filler material for welding was prepared having the following composition weight percentages:

|  | Molten Alloy Iron | Annealed Alloy Iron |
|---|---|---|
| Carbon | 0.50% | 0.02% |
| Manganese | 0.15% | 0.15% |
| Silicon | 0.10% | 0.09% |
| Sulphur | 0.01% | 0.01% |
| Phosphorus | 0.01% | 0.01% |
| Chromium | 0.25% | 0.25% |
| Nickel | 2.0% | 1.98% |
| Molybdenum | 0.5% | 0.47% |
| Iron | Balance | Balance |

The molten alloy iton stream was atomized and the resulting speroidally shaped particles were cooled in a waterbath. Annealing was accomplished in a hydrogen atmosphere at a temperature of approximately 900°C. for 1.5 hours. The annealed material was thoroughly mixed after being broken up. The particles, as in all test runs, were passed through a No. 200 sieve and a No. 20 sieve. The resulting filler material had a screen analysis as follows:

| Sieve No. (U.S. Standard) | Weight Percentage |
|---|---|
| +20 | 0.0 |
| −32/+40 | 4.0 |
| −40/+60 | 27.0 |
| −60/+80 | 33.0 |
| −80/+100 | 26.0 |
| −100/+200 | 9.0 |
| −200 | 1.0 |

The filler material was used in a submerged arc welding process between steel plates forming a V-groove between them. The flux used had a weight percentage composition as follows: (a) 7.0 percent silicon dioxide; (b) 24.9 percent manganese dioxide; (c) 8.3 percent calcium oxide; (d) 38.0 percent calcium fluoride; (e) 7.4 percent magnesium oxide; and (f) 14.4 percent aluminum oxide. Substantially the same flux composition was used in all of the examples as herein detailed. As in previous examples, the apparant density of the filler material was varied throughout the range of 2.75 grams/c.c. to 3.9 grams/c.c. The following results were obtained:

| No. | Apparant Density (grams/c.c.) | Weld Comments |
|---|---|---|
| 1 | 2.75 | Fair Weld-Large Heat affected zone-porosity low-lower weld strength |
| 2 | 3.0 | Excellent Weld-No porosity observed-high weld strength |
| 3 | 3.25 | Excellent Weld-No porosity |

-Continued

| No. | Apparant Density (grams/c.c.) | Weld Comments |
|---|---|---|
| | | observed-high weld strength |
| 4 | 3.5 | Good Weld-backflash and bubbling observed |
| 5 | 3.90 | Fair Weld-backflash and bubbling observed. |

Using substantially the same composition at an apparant density of 3.0 grams/c.c., the percentage of powder fines having a particle size less than a No. 200 sieve was increased to 7.0 percent by weight of the filler composition. The resulting weld had some porosity. The voids were observed at the weld/metal interface area resulting in a less accptable weld.

What is claimed is:

1. An atomized welding filler material for submerged arc welding consisting essentially of by weight: (a) from 0.01 percent to 0.05 percent carbon; (b) 0.15 percent to 2.0 percent manganese; (c) from 0.01 percent to 0.15 percent silicon; (d) less than or equal to 0.020 percent sulphur; (e) less than or equal to 0.015 percent phosphorus; (f) less than or equal to 0.25 percent chromium; (g) from 0.01 percent to 2.0 percent nickel; (h) from 0.01 to 1.00 percent molybdenum and (i) the balance being iron, said atomized filler material having particle sizes less than about No. 20 sieve, with less than 5.0 percent by weight of said filler material particles having a particle size less than a No. 200 sieve.

2. The atomized filler material for submerged arc welding as recited in claim 1 where said rounded particles have a particle size wherin less than 15.0 percent by weight of said filler material includes a particle size less than a No. 100 sieve.

3. The atomized filler material for submerged arc welding as recited in claim 1 where said particles include a particle size in weight percentages of: (a) approximately 5.0 percent larger than a No. 40 sieve; (b) from 10.0 percent to 30.0 percent larger than a No. 60 sieve; (c) from 30.0 percent to 50 percent larger than No. 100 sieve; (e) less than 15.0 percent larger than a No. 200 sieve.

4. The atomized filler material for submerged arc welding as recited in claim 1 where said manganese content is in the range of 0.15 percent to 0.15 percent by weight of said filler material.

5. The atomized filler material for submerged arc welding as recited in claim 1 where said nickel content is in the range of 1.75 percent to 2.0 percent by weight of said filler material.

6. The atomized filler material for submerged arc welding as recited in claim 5 wherein less than 5.0 percent by weight of said filler material particles have a particle size less than a No. 200 sieve.

7. The atomized filler material for submerged arc welding as recited in claim 1 where said molybdenum content is in the range of 0.25 percent to 0.50 percent by weight of said filler material.

8. The atomized filler material for submerged arc welding as recited in claim 7 wherein less than 5.0 percent by weight of said filler material particles have a particle size less than a No. 200 sieve.

9. The atomized filler material for submerged arc welding as recited in claim 1 where said atomized welding filler material has an apparent density within the approximate range from 2.9 to 3.85 grams/c.c.

10. The atomized filler material for submerged arc welding as recited in claim 9 where said atomized welding filler material has an apparant density within the range from 3.0 to 3.25 grams/c.c.

11. The atomized filler material for submerged arc welding as recited in claim 9 wherein less than 5.0 percent by weight of said filler material particles have a particle size less than a No. 200 sieve.

12. An atomized alloy iron filler matieral for submerged arc welding consisting essentially of a multiplicity of discrete, spheroidally contoured particles, each of said particles having a substantially equal chemical composition, said particles having particle sizes less than about No. 20 sieve and has been inserted to overcome the rejections of record; and a size distribution anaylsis wherein less than 5.0 percent by weight of said filler material particles have a particle size less than a No. 200 sieve said filler material having a chemical composition of said particles consisting essentially by weights of: (a) from 0.01 percent to 0.05 percent carbon; (b) from 0.15 percent to 2.0 percent manganese; (c) a predetermined weight percentage of alloying constituents selected from the group consisting of silicon, sulphur, phosphorus, chromium, nickel and molybdenum and mixtures thereof; and the balance being iron.

13. The atomized alloy iron filler material as recited in claim 12 wherein less then 15.0 percent by weight of said filler material includes a particle size less than a No. 100 sieve.

14. The atomized alloy iron filler material as recited in claim 13 wherein a maximum of 5.0 percent by weight of said filler material includes a particle size greater than a No. 40 sieve.

15. The atomized alloy iron filler material as recited in claim 14 where said substantially all of said particles include a particle size less than a No. 20 sieve.

* * * * *